(12) United States Patent
Dohi et al.

(10) Patent No.: US 9,254,529 B2
(45) Date of Patent: Feb. 9, 2016

(54) WIRE ELECTRIC DISCHARGE MACHINING APPARATUS

(75) Inventors: Yuzo Dohi, Kanagawa (JP); Hirotoshi Inoue, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 226 days.

(21) Appl. No.: 14/005,826

(22) PCT Filed: Mar. 23, 2012

(86) PCT No.: PCT/JP2012/057601
§ 371 (c)(1),
(2), (4) Date: Sep. 18, 2013

(87) PCT Pub. No.: WO2012/128364
PCT Pub. Date: Sep. 27, 2012

(65) Prior Publication Data
US 2014/0008329 A1   Jan. 9, 2014

(30) Foreign Application Priority Data

Mar. 23, 2011   (JP) .................................. 2011-064785

(51) Int. Cl.
| | | |
|---|---|---|
| B23H 7/10 | (2006.01) | |
| B23H 1/10 | (2006.01) | |
| B23H 7/30 | (2006.01) | |

(52) U.S. Cl.
CPC .................. *B23H 1/10* (2013.01); *B23H 7/102* (2013.01); *B23H 7/30* (2013.01)

(58) Field of Classification Search
CPC ............. B23H 7/102; B23H 1/10; B23H 7/30
See application file for complete search history.

(56) References Cited

U.S. PATENT DOCUMENTS

| | | | | |
|---|---|---|---|---|
| 4,417,118 | A |   | 11/1983 | Miyano |
| 4,495,393 | A | * | 1/1985 | Janicke ...................... 219/69.12 |
| 4,598,189 | A | * | 7/1986 | Inoue et al. ................ 219/69.12 |
| 4,698,476 | A | * | 10/1987 | Yamamoto et al. ........ 219/69.12 |
| 5,036,174 | A | * | 7/1991 | Iwasaki et al. ............. 219/69.12 |

(Continued)

FOREIGN PATENT DOCUMENTS

| | | |
|---|---|---|
| JP | 01-135423 | 5/1989 |
| JP | 04-111717 | 4/1992 |

(Continued)

OTHER PUBLICATIONS

"International Search Report (Form PCT/ISA/210)", mailed on Jun. 26, 2012, with English translation thereof, p. 1-p. 4.

(Continued)

*Primary Examiner* — Geoffrey S Evans
(74) *Attorney, Agent, or Firm* — Jianq Chyun IP Office

(57) ABSTRACT

A wire electric discharge machining apparatus is provided to equip with an automatic wire threader more reliably threading a wire electrode through an start hole. The wire electric discharge machining apparatus includes an automatic wire threader including: a feed roller disposed higher than the start hole and feeding a wire electrode toward the start hole; and a vertical drive device disposed between the feed roller and the start hole, and supplying compressed air in the upward and downward directions to vertically move the wire electrode slightly. The vertical drive device includes wire guides having guide holes through which the wire electrode is passed. The wire guides are constructed so that upward movement by the compressed air is possible.

6 Claims, 6 Drawing Sheets

(56) References Cited

U.S. PATENT DOCUMENTS

| | | | |
|---|---|---|---|
| 5,057,663 A * | 10/1991 | Kinoshita | 219/69.12 |
| 5,126,524 A | 6/1992 | Moro et al. | |
| 6,078,019 A | 6/2000 | Medici et al. | |
| 6,294,748 B1 | 9/2001 | Moro et al. | |
| 6,294,749 B1 | 9/2001 | Moro et al. | |
| 6,344,624 B1 | 2/2002 | Moro et al. | |
| 6,495,789 B2 * | 12/2002 | Baiardi et al. | 219/69.12 |
| 6,698,639 B1 | 3/2004 | Otomo et al. | |
| 2009/0236318 A1 * | 9/2009 | Sakaguchi | 219/69.12 |

FOREIGN PATENT DOCUMENTS

| | | |
|---|---|---|
| JP | H05-092321 | 4/1993 |
| JP | 2005-001054 | 1/2005 |
| JP | 2006-231417 | 9/2006 |
| JP | 2008-012643 | 1/2008 |

OTHER PUBLICATIONS

"Search Report of European Counterpart Application", issued on Jul. 25, 2014, p. 1-p. 4.

* cited by examiner

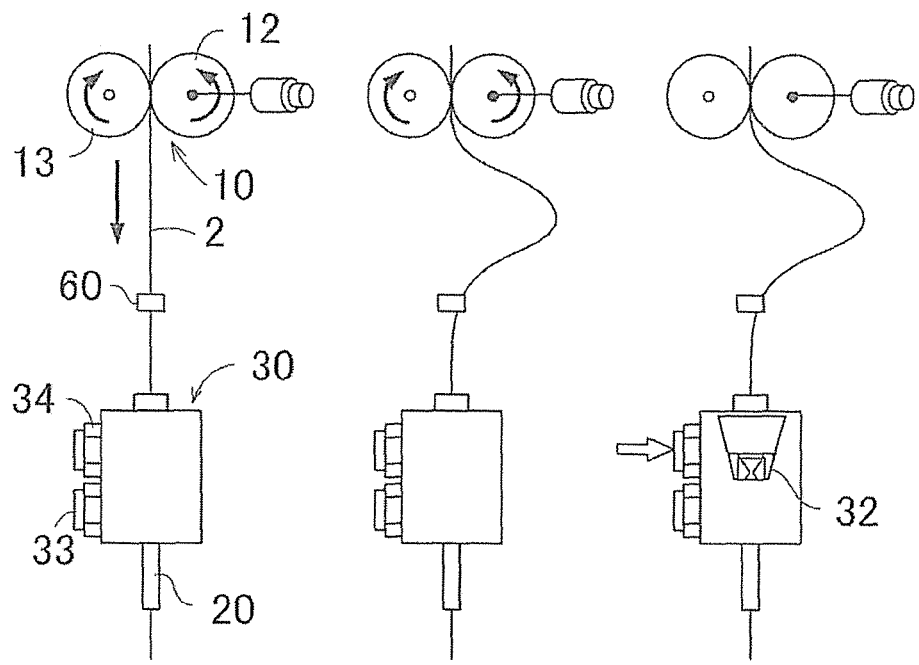
FIG.3A    FIG.3B    FIG.3C
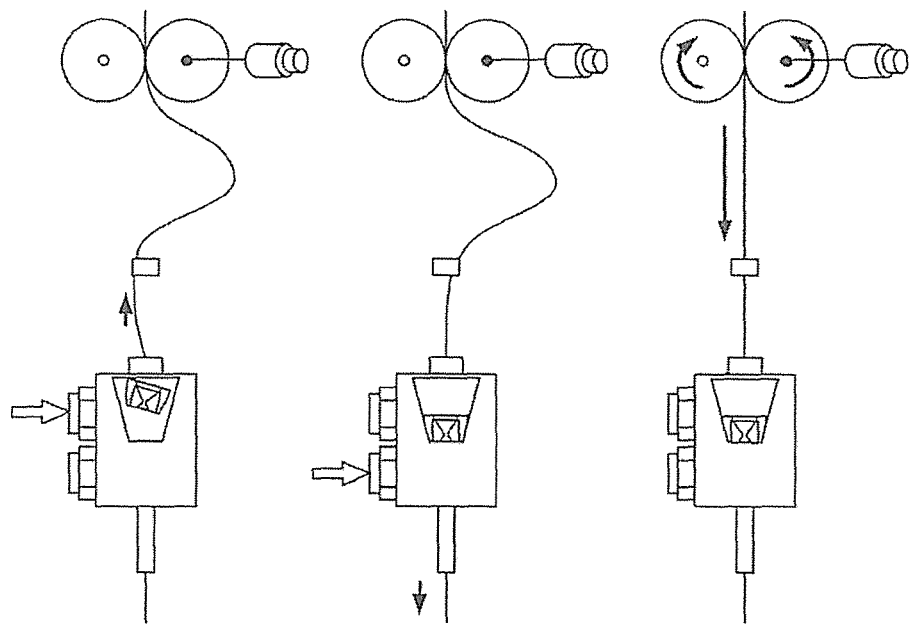
FG.3D    FG.3E    FIG.3F

WIRE ELECTRIC DISCHARGE MACHINING APPARATUS

CROSS-REFERENCE TO RELATED APPLICATIONS

This application is a 371 application of an international PCT application Ser. No. PCT/JP2012/057601, filed on Mar. 23, 2012, which claims the priority benefit of Japan application No. 2011-064785, filed on Mar. 23, 2011. The entirety of each of the above-mentioned patent applications is hereby incorporated by reference herein and made a part of this specification.

TECHNICAL FIELD

The present invention relates to a wire electric discharge machining apparatus that uses a wire electrode to machine a work by electric discharge, wherein the wire electrode is supported between an upper wire guide and a lower wire guide. In particular, the present invention relates to a wire electric discharge machining apparatus having an automatic wire threader that automatically threads a wire electrode through a start hole or a machined kerf.

BACKGROUND TECHNIQUE

In general, a wire electric discharge machining apparatus is equipped with an automatic wire threader which is capable of automatically threading a wire electrode through a start hole. A wire electrode of 0.1 mm to 0.3 mm in diameter is typically used. The start hole is formed in the work in advance to wire electric discharge machining. If the wire electrode is broken during the machining process, the automatic wire threader threads the wire electrode through a machined kerf in order to commence machining again. A guide pipe for guiding the wire electrode straight to the start hole or the machined kerf is provided to many of automatic wire threaders. The start hole and the machined kerf are hereinafter collectively referred to as the start hole.

The gap (hereinafter referred to as a "clearance") between the wire electrode and the start hole is small. Therefore, failure may occur if the front end of the wire electrode does not reach the start hole or is caught by the inner wall of the start hole. The feeding of the wire electrode is halted slightly after such failure is detected. At the time, the wire electrode is already loosened. The wire is tightened after the wire electrode is winded. Then, the wire electrode is again sent towards to the start hole. The failure in an automatic wire threading lengthens the required operation time.

The patent document 1 disclosed a method for eliminating the loosening of a wire electrode to avoid a repetitive failure in an automatic wire threading operation. The patent document 2 disclosed a method for guiding a wire electrode to the start hole by applying horizontal micro-vibration with compressed air. The patent document 3 disclosed a method for searching a start hole automatically and positioning the front end of the wire electrode to the entrance of a start hole.

The patent document 4 disclosed a device that eliminates a stuck wire electrode by moving the wire electrode up and down slightly. According to the invention, the operation of the device is similar to an action that a person pinches a thread and tries to thread its front end though a small hole again and again. The wire electrode is threaded through the start hole without being winded, and the time required for automatic wire threading is shortened. It has been proven that the probability of the wire electrode threading through the start hole is high even when the upper wire guide is away from the start hole.

PRIOR ART DOCUMENTS

Patent Documents

Patent Document 1: Japanese Patent-Laid Open No. H4-111717
Patent Document 2: Japanese Patent-Laid Open No. 2005-1054
Patent Document 3: Japanese Patent-Laid Open No. H1-135423
Patent Document 4: Japanese Patent-Laid Open No. 2006-231417

SUMMARY OF THE INVENTION

In view of above, a wire electric discharge machining apparatus is provided to equip with an automatic wire threader that threads a wire electrode through a start hole more accurately.

The present invention is related to a wire electric discharge machining apparatus having an automatic wire threader which automatically threads a wire electrode through a start hole formed in a work. The feature of the automatic wire threader includes a feed roller which is disposed at a position higher than the start hole and threads a wire electrode toward the start hole, and a vertical drive device which is disposed between the feed roller and the start hole and supplies compressed air in the upward direction and in the downward direction to vertically move the wire electrode slightly. Here, the meaning of the term "start hole" also includes a machined kerf formed in the work by a wire electric discharge machining.

Preferably, the vertical drive device includes wire guides having a guide hole and the wire electrode passes therethrough, and the wire guides are capable of moving in the upward direction.

The vertical drive device has a vertical path through which the wire electrode passes. It is essential that the vertical drive device includes a first wire guide having a guide hole which is small to an extent that the compressed air is almost unable to pass through. It is essential that the vertical drive device has a first air supply path communicating with the vertical path at a position lower than the guide hole of the first wire guide. It is essential that the vertical drive device has a second air supply path communicating with the vertical path at a position higher than the guide hole of the first wire guide, and a compressed air supply device for supplying the compressed air to the second air supply path.

It is essential that the vertical drive device has a second wire guide disposed a position higher than the first wire guide, a second air supply path communicating with the vertical path between the first wire guide and the second wire guide, and a compressed air supply device for supplying the compressed air to the second air supply path.

It is essential that the second wire guide have a guide clearance which is small to an extent that the compressed air is almost unable to pass therethrough and are capable of moving in the upward direction by the compressed air. Alternatively, it is essential that the second wire guide has a guide clearance which is large to an extent that the compressed air is able to pass therethrough.

Preferably, the vertical drive device has a first air supply path communicating with the vertical path at a position lower than the guide hole of first wire guides, a second air supply path communicating with the vertical path at a position higher than the guide hole of the first wire guide, and a compressed air supply device for supplying the compressed air alternately to the first air supply path and the second air supply path.

In the wire electric discharge machining apparatus of the present invention, the wire electrode is not restrained and the wire electrode is moved vertically by compressed air. Thus, the ability of the wire electrode to move straightly can be maintained. In addition, the time for moving the wire electrode up and down slightly and the moving distance (amplitude of vibration) are not affected by any mechanical constraints. Therefore, it is possible to move the wire electrode for a long distance in the upward direction and in the downward direction respectively within a relatively short period of time.

BRIEF DESCRIPTION OF THE DRAWINGS

FIGS. 3A to 3F illustrate a wire threading operation using the vertical drive device shown in FIG. 2.

DESCRIPTION OF PREFERRED EMBODIMENTS

Figure 1:
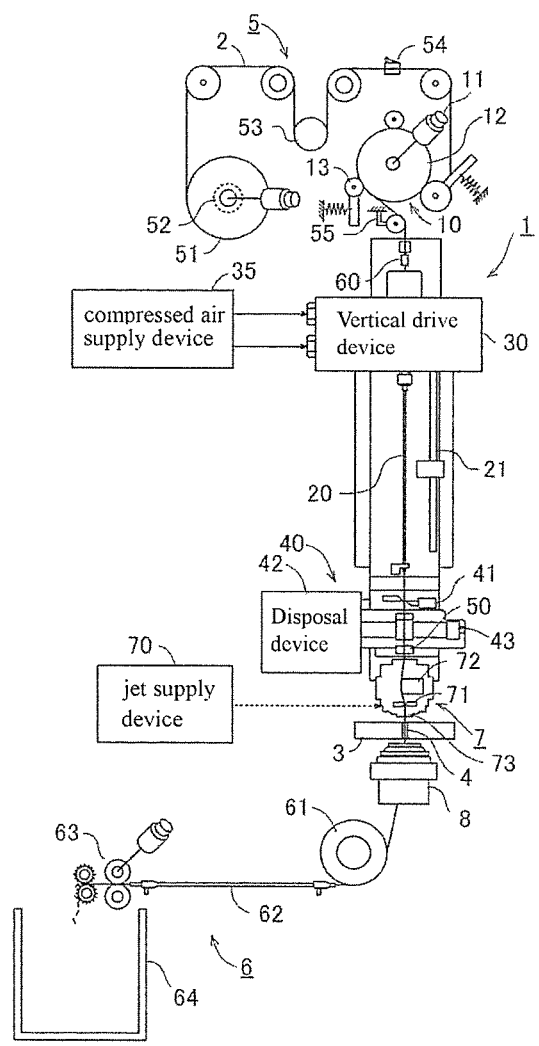
FIG. 1 is a schematic view illustrating a wire electrical discharge machining apparatus of the present invention.

A wire electric discharge machining apparatus of the present invention is illustrated in FIG. 1. An automatic wire threader 1 is provided for automatically threading a wire electrode 2 through a start hole 4 formed in a work 3. The automatic wire threader 1 has a feed roller 10 for feeding the wire electrode 2 to the start hole 4, and a guide pipe 20 for guiding the wire electrode 2. The automatic wire threader 1 has a vertical drive device 30 for vertically driving the wire electrode 2 up and down slightly along a wire running path by compressed air.

The slight vertical motion of the present invention refers to the motion of the wire electrode 2 repeatedly moves up and down along the wire running path within several hundreds milliseconds to several seconds. The distance of the vertical motion is several to 20-plus millimeters respectively in the upward direction and the downward direction. The movement of the wire electrode 2 is similar to the action of a person pinching the wire electrode 2 and prodding it toward the start hole 4, rather than to vertical vibration.

The automatic wire threader 1 has a front-end processing device 40 for cutting a rough front end of the wire electrode 2. The front-end processing device 40 includes a cutter 41, a disposal box 42, and a clamp 43. The automatic wire threader 1 has a front-end detector 50 for detecting the front end of the wire electrode 2, and a buckling detector 60 for detecting the loosening of the wire electrode 2.

A supply mechanism 5 consecutively supplies a new wire electrode 2 to the work 3. The supply mechanism 5 includes a reel 52, a servo pulley 53, the feed roller 10, a breaking detector 54 and a tension detector 55. A wire bobbin 51 is loaded to the reel 52. The reel 52 includes a brake motor for providing a reverse tension to the wire electrode 2. The servo pulley 53 prevents variation in the tension. The feed roller 10 feeds the wire electrode 2 toward a wind-up roller 63 as well as applies tension to the wire electrode 2. The breaking detector 54 is provided for detecting a breaking of the wire electrode 2, and is a limit switch, for example. The tension detector 55 is provided for detecting the tension of the wire electrode 2, and is a strain gauge, for example.

An eject mechanism 6 retrieves the wire electrode 2 consumed by electric discharge machining. The eject mechanism 6 includes an idling roller 61 for changing the direction of the wire running path, a carrying device 62 for carrying the wire electrode 2 by fluid, the wind-up roller 63 for winding up the wire electrode 2, and a bucket 64 for recycling the used wire electrode 2.

Guide assemblies are disposed above and below the work 3. An upper guide assembly 7 accommodates an upper wire guide 71, an upper conducting body 72, and an AWT nozzle (not shown). The upper guide assembly 7 has an upper nozzle 73 at its lower end. The aperture of the upper nozzle 73 faces the work 3. A lower guide assembly 8 has a lower wire guide, a lower conductive body, and a lower nozzle. The upper wire guide 71 and the lower wire guide position the wire electrode 2 at a position as close to the work 3 as possible.

The automatic wire threader 1 includes a jet supply device 70 capable of supplying high-pressure electric discharge machining fluid to the AWT nozzle. The AWT nozzle generates fluid jet for constraining the wire electrode 2. The fluid jet increases the success rate of automatic wire threading. The jet supply device 70 is selectively used when the success rate of automatic wire threading is low. The jet supply device 70 is required when a brass wire electrode 2 with 0.05 mm to 0.08 mm in diameter is used, or when the clearance of the start hole 4 is small.

The feed roller 10 is disposed above the start hole 4. The feed roller 10 is ordinarily disposed above the upper wire guide 71 and a guide pipe 20. The feed roller 10 comprises a driving roller 12 and a pinch roller 13. The driving roller 12 is capable of rotating by a servomotor 11. The pinch roller 13 is driven by the driving roller 12 and presses the wire electrode 2.

The feed roller 10 slowly feeds the wire electrode 2 with normal rotation. The feed roller 10 winds up the wire electrode 2 with reverse rotation. When the front-end detector 50 detects the front end of the wire electrode 2, the reverse rotation of the feed roller 10 is halted. The feed roller 10 cooperates with the wind-up roller 63 and provides a predetermined tension to the running wire electrode 2.

The guide pipe 20 is disposed between the feed roller 10 and the upper wire guide 71. A lifting device 21 operated by an actuator lifts the guide pipe 20 up and down. During the automatic wire threading operation, the lower end of the guide pipe 20 is lowered down to the position immediately above the upper wire guide 71 to guide the wire electrode 2 to the upper wire guide 71.

A vertical drive device 30 illustrated in FIG. 1 is disposed between the feed roller 10 and the start hole 4. The vertical drive device 30 supplies compressed air with predetermined pressure to the upward direction and the downward directions alternately along the wire running path. The vertical drive device 30 moves the wire guide holding the wire electrode 2 upwards by the upward compressed air, and moves the wire guide downwards by the downward compressed air. As such, an action to slightly lift up the wire electrode 2 and an action to slightly send out the wire electrode 2 are repeated within a short period of time.

The vertical drive device 30 intermittently supplies the compressed air along the wire running path. The vertical drive device 30 is capable of generating a strong and downward air flow by supplying the compressed air to the inside of the guide pipe 20 during automatic wire threading. This downward air flow helps the wire electrode 2 to move straight down.

Figure 2:
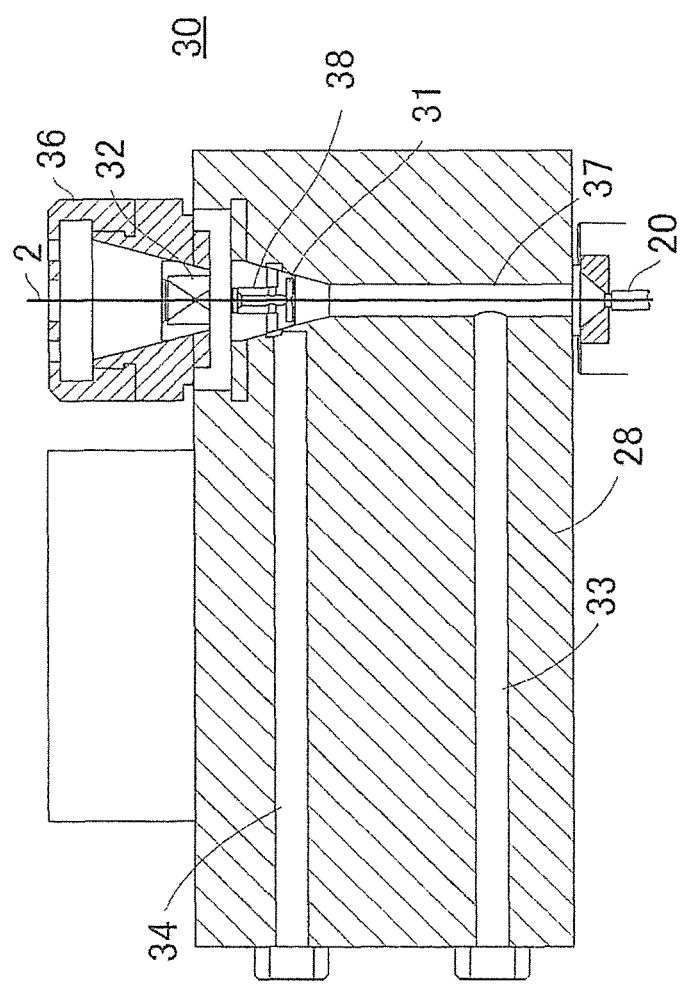
FIG. 2 is a cross-sectional view illustrating a first example of a vertical drive device.
Figure 4:
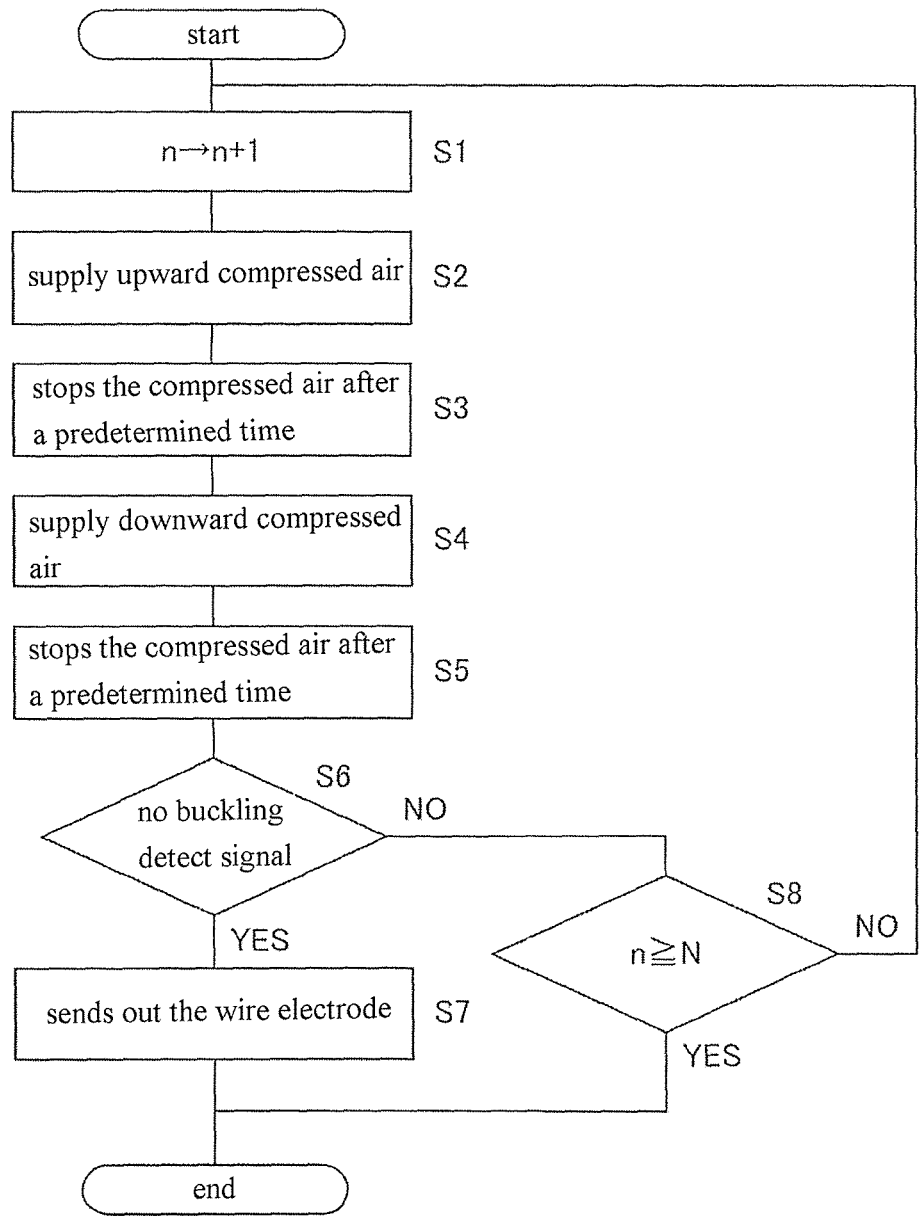
FIG. 4 is a flowchart showing a wire threading operation using the vertical drive device shown in FIG. 2.

Referring to FIG. 2, the vertical drive device 30 in a first embodiment of the present invention is illustrated in detail. The wire electrode 2 vibrates only horizontally if compressed air is merely blown to the wire electrode 2. It is necessary to move the wire electrode 2 back and forth along the upward direction and the downward direction little by little within a short period of time. Therefore, by the structure shown in FIG. 2, the vertical drive device 30 moves the wire electrode 2 by a force created by the air for several to 20-plus millimeters in the upward direction and the downward direction respectively within several hundred milliseconds to several seconds.

The vertical drive device 30 comprises a rectangular block 28, a first wire guide 31, a second wire guide 32, and a compressed air supply device 35. The vertical drive device 30 has a vertical path through which the wire electrode 2 passes. A cylindrical sealed space 37 extending vertically is formed in the block 28. The wire electrode 2 passes through the sealed space 37, and the sealed space 37 forms the vertical path. Two air supply paths, 33 and 34, extending horizontally are formed in the block 28. The first wire guide 31 and the second wire guide 32 guide the wire electrode 2.

The first wire guide 31 is disposed between the feed roller 10 and the start hole 4. Specifically, the first wire guide 31 is disposed between the feed roller 10 and the guide pipe 20. The first wire guide 31 is incapable of moving down. The first wire guide 31 is dice-shaped and has a guide hole through which the wire electrode 2 passes. The gap between the guide hole of the wire guides and the wire electrode 2 is referred to a guide clearance. The first wire guide 31 has a guide clearance of 3 µm to 20 µm, and compressed air is mostly unable to pass through this small guide clearance.

The sealed space 37 is determined by the guide hole of the first wire guide 31 and the guide pipe 20. The term "sealed" in the sealed space 37 means that the space 37 is not opened except to the guide clearance of the first wire guide 31 and the inlet of the guide pipe 20.

The second wire guide 32 is disposed between the feed roller 10 and the first wire guide 31. The second wire guide is dice-shaped and has a guide hole through which the wire electrode 2 passes. The guide holes of the first wire guide 31 and the second wire guide 32 form the vertical path. The second wire guide 32 has a guide clearance of the same size to that of the first wire guide. A cap 36 is fixed on the upper surface of the block 28. A funnel-shaped chamber is formed in the cap 36. The second wire guide 32 has a similar outer shape to the funnel-shaped chamber, and positions at the bottom of the chamber by its own weight. The second wire guide 32 is loosely fitted inside the funnel-shaped chamber.

The second wire guide 32 is disposed immediately above the first wire guide 31, and a sealed space 38 is formed between the guide holes of the two wire guides 31 and 32. The sealed space 38 forms a vertical path. The term "sealed" in the sealed space 38 means that the space 38 is not opened except to the two guide clearances. The sealed space 38 comprises mainly a funnel-shaped chamber extending vertically in the first wire guide 31.

The first and second wire guides, 31 and 32, are replaceably attached to the block 28. Therefore, the first and second wire guides, 31 and 32, can be replaced according to the diameter of the wire electrode 2.

To supply the compressed air, the second air supply path 34 is communicated with the sealed space 38 at a position higher than the guide hole of the first wire guide 31. The compressed air blows upward when it is supplied to the sealed space 38. As a result, the second wire guide 32 floats and tilts slightly. Because the second wire guide 32 has a small guide clearance, the wire electrode 2 touches the inner surface of the guide hole of the second wire guide 32. A frictional force is generated between the second wire guide 32 and the wire electrode 2. The second wire guide 32 moves upward, while holding the wire electrode 2, until the second wire guide 32 collides against the ceiling of the chamber of the cap 36. Because the wire guide 32 helps the wire electrode 2 to move straight upward for a predetermined distance, the compressed air with extreme high pressure or high speed is not required. The predetermined distance is determined by the height of the chamber in the cap 36.

To supply the compressed air, the first air supply path 33 is communicated with a path 37 at position lower than the guide hole of the first wire guide 31. Because the first wire guide 31 has a small guide clearance to an extent that the compressed air almost cannot pass therethrough, the compressed air in the sealed space 37 flows downward along the wire running path. As a result, a strong downward air flow is generated, and the lifted wire electrode 2 moves downward along the wire running path.

The compressed air supply device 35 supplies the compressed air to the first air supply path 33 and the second air supply path 34 alternately with a predetermined time interval. The compressed air supply device 35 comprises an air compressor, an air regulator, a bidirectional electromagnetic valve that operates with high speed, a flow control valve, and a setting device. The air regulator maintains the compressed air at a predetermined pressure. The bidirectional electromagnetic valve switches the connections to the first air supply path 33 and to the second air supply path 34 at a predetermined time interval. The flow control valve is disposed between the air regulator and the bidirectional electromagnetic valve to control the compressed air supply. The setting device sets the compressed air pressure of the air regulator, the switching time of the bidirectional electromagnetic valve, and the aperture of the flow control valve.

The compressed air supply device 35 is controlled by a control device such as a sequencer (not shown) that controls the entire operations of the automatic wire threader 1. This control device can include the setting device of the compressed air supply device 35. The control device operates the vertical drive device 30 in response to a signal from the buckling detector 60.

Referring to FIGS. 1, 2, 3A-3F and 4, an example of the operations of the automatic wire threader 1 according to the invention is described. FIGS. 3A-3F illustrates an automatic wire threading process performed after an unexpected wire breaking. After an unexpected wire breaking, the feed roller 10 winds up the wire electrode 2 until the front-end detector 50 detects the front end of the wire electrode 2. The cutter 41 cuts the wire electrode 2. The clamp device 43 transports the unnecessary cut-off piece of the wire electrode 2 to the disposal box 42. Preferably, an annealing device (not shown) anneals the wire electrode 2, thus the straightness of the wire electrode 2 is improved. The position, in a horizontal plane, of the wire electrode 2 being supported vertically is aligned to the start hole 4.

As show in FIG. 3A, the wire electrode 2 is sent to the start hole 4 by the feed roller 10. It is assumed that the front end of the wire electrode 2 is stuck in the work 3 and buckles on the way of the wire running path. As shown in FIG. 3B, the wire electrode 2 is loosened between the feed roller 10 and the guide pipe 20 because of the buckling. When the buckling detector 60 detects this buckling, the feed roller 10 halts immediately. When the wire electrode 2 buckles, the operation to vertically move the wire electrode 2 is performed by operating the vertical drive device 30. The number of the wire electrode 2 moving up is counted (S1) and is denoted as a counting number "n".

As shown in FIG. 3C, the vertical drive device 30 is operated, and the compressed air supply device 35 sends the compressed air with predetermined pressure to the sealed space 38 through the second air supply path 34 (S2). As shown in FIG. 3D, the second wire guide 32 is pushed upward with holding the wire electrode 2 along the wire running path. As a result, the chance that the wire electrode 2 being stuck is eliminated. The compressed air supply device 35 stops supplying the compressed air from the second air supply path 34 after a predetermined time (S3). Concurrently, the compressed air supply device 35 sends the compressed air with predetermined pressure to the sealed space 37 from the first air supply path 33 (S4). After a predetermined time, the supply of the compressed air from the first air supply path 33 is halted (S5).

As shown in FIG. 3E, the wire electrode 2 is moved downward along the supply path by the force of the strong downstream air flow generated by the compressed air. Thus, as shown in FIG. 3F, loosening of the wire electrode 2 is eliminated. At the time, the second wire guide 32 is pulled downward, and returns to the bottom of the funnel-shaped chamber.

When the buckling detector 60 does not detect a buckling of the wire electrode 2 for a predetermined time (S6), the feed roller 10 sends out the wire electrode 2 (S7). The wire electrode 2 is sent to the wind-up roller 63, and the automatic wire threading process is completed. If buckling of the wire electrode 2 is detected again, the vertical movement of the wire electrode 2 is again repeated by the supplying compressed air. Even when a buckling is detected, winding up of the wire electrode 2 is not required. When the count n of the vertical movement of the wire electrode 2 reaches a set count N (S8), the automatic wire threading process is completed.

The compressed air is sent from the first air supply path 31 and second air supply path 32 alternately for a time interval of approximately 0.4 second. The supplying time of the compressed air is 2 seconds. By doing so, the wire electrode 2 is moved in the upward direction and in the downward direction several millimeters to 20-plus millimeters respectively. Thus, the wire electrode 2 being stuck is eliminated reliably, and the wire electrode 2 is threaded straight through the start hole 4.

Because the operations shown in FIGS. 3D and 3E are only repeated for a short period of time, which is approximately several seconds to several tens of seconds, it is not necessary to wind up the wire electrode 2 every time it is buckled; and by simple operations, the wire electrode 2 can certainly be threaded through the start hole 4 and the lower wire guide. In addition, there is an advantage that the structure is simple because the wire electrode 2 can be threaded through the start hole 4 by the vertical drive device 30 that vertically move the wire electrode 2 slightly by the compressed air, without completely winding up the wire electrode 2.

Because the vertical drive device 30 applies slightly up and down movement to the wire electrode 2 by the compressed air, the wire electrode 2 is not directly and mechanically restrained. Also, because the wire electrode 2 is moved downward by a strong downstream air flow caused by the compressed air, the wire electrode 2 can be swiftly moved forward.

Figure 5:
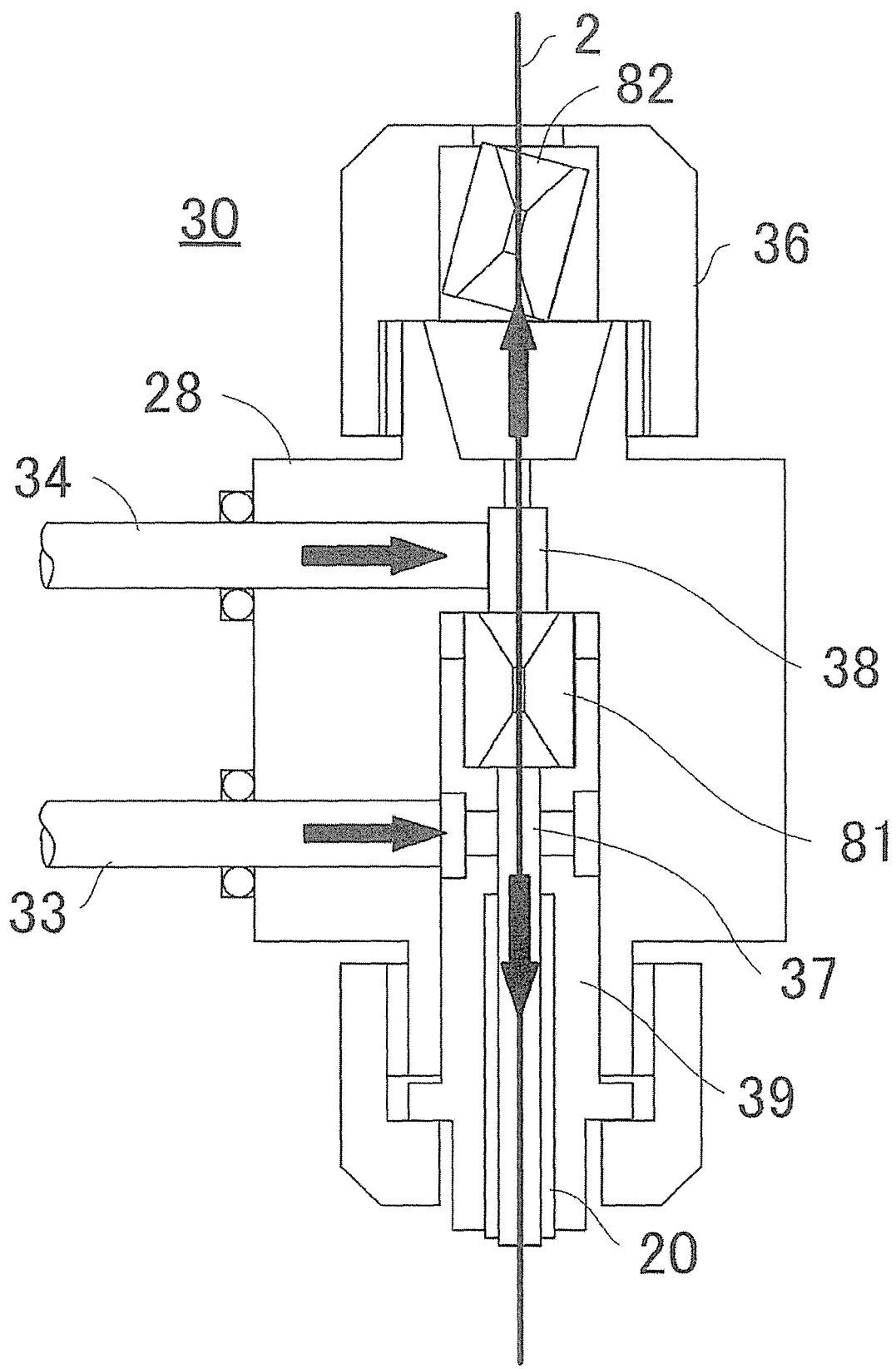
FIG. 5 is a cross-sectional view illustrating a second example of a vertical drive device.

Referring to FIG. 5, a vertical drive device 30 in a second embodiment of the present invention is described. Elements that are the same as those of the vertical drive device in FIG. 2 are assigned with the same reference numbers, and their descriptions are omitted. The first and second wire guides 81 and 82, correspond respectively to the first and second wire guides 31 and 32, in FIG. 2. However, the first and the second wire guides 81 and 82 differ from the first and second wire guides 31 and 32 by having the same simple dice shape. In FIG. 5, the second wire guide colliding with the ceiling of a chamber of the cap 36 is shown.

In the vertical drive device 30 in FIG. 2, the cylindrical sealed space 38 is formed mainly inside the first wire guide 31. However, in the vertical drive device 30 in FIG. 5, the cylindrical sealed space 38 is formed inside a block 28. A guide pipe 20 is supported by a pipe holder 39. The pipe holder 39 is fixed to the block 28. The sealed space 37 is formed inside the pipe holder 39. The vertical drive device 30 in FIG. 5 has an advantage not requiring a special wire guide.

Figure 6:
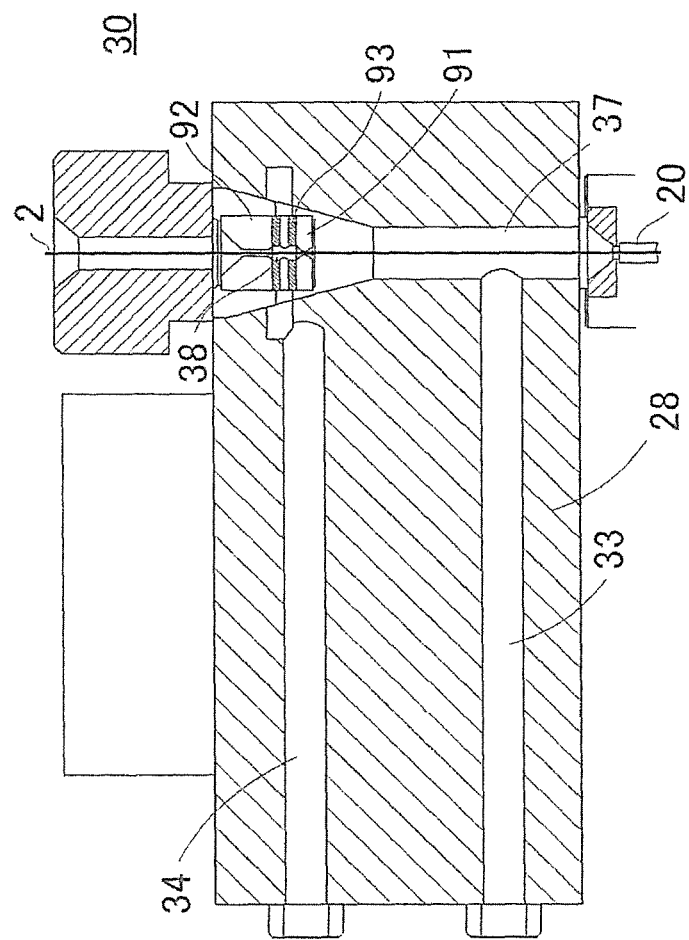
FIG. 6 is a cross-sectional view illustrating a third example of a vertical drive device.

Referring to FIG. 6, a vertical drive device 30 in a third embodiment of the present invention is described. Elements that are the same as those of the vertical drive device in FIG. 2 are assigned the same reference numbers, and their descriptions are omitted. A first and a second wire guide 91 and 92 correspond respectively to the first and second wire guides 31 and 32, in FIG. 2. The first and second wire guides 91 and 92 have a simple dice-shape. A chamber piece 93 is disposed between the first and second wire guides 91 and 92. A cylindrical sealed space 38 extending vertically is formed inside the chamber piece 93.

The second wire guide 92 can not move upward, which differs from the second wire guides 32 and 82. Also, the second wire guide 92 has a larger guide clearance than that of the first wire guide 91, which differs from the second wire guides 32 and 82. The guide clearance of the first wire guide 91 is 3 μm to 20 μm, which is the same as that of the wire guides 31, 32, and 82. In contrast, the guide clearance of the second wire guide 92 is 100 μm to 1 mm. This guide clearance is large to an extent that the compressed air is able to pass therethrough.

The embodiments are selected to explain the nature of the present invention and practical application. Various improvements are possible referring the above-mentioned description. The scope of the invention is defined by the attached claims.

What is claimed is:

1. A wire electrical discharge machining apparatus, having an automatic wire threader for automatically threading a wire electrode through a start hole formed in a work, the automatic wire threader comprising:

a feed roller, disposed at a position higher than the start hole, and feeding the wire electrode to the start hole; and a vertical drive device, disposed between the feed roller and the start hole, and moving the wire electrode up and down slightly by supplying compressed air in an upward direction and in a downward direction, wherein the vertical drive device comprises:

a vertical path through which the wire electrode passes;

a first wire guide having a guide hole which forms the vertical path and is small to an extent that the compressed air is unable to pass through;

a second wire guide, disposed at a position higher than the first wire guide;

an air supply path, communicating with the vertical path between the first wire guide and the second wire guide; and a compressed air supply device for supplying the compressed air to the vertical path in an upward direction through the air supply path so as to move the second wire guide upward.

2. The wire electrical discharge machining apparatus according to claim 1, wherein the vertical drive device comprises:
   a lower air supply path, communicating with the vertical path at a position lower than the guide hole, wherein the compressed air supply device supplies the compressed air to the lower air supply path.

3. The wire electrical discharge machining apparatus according to claim 1, wherein the second wire guide has a guide clearance which is small to an extent that the compressed air is unable to pass therethrough, and is capable of moving upward by the compressed air.

4. A wire electrical discharge machining apparatus, having an automatic wire threader for automatically threading a wire electrode through a start hole formed in a work, the automatic wire threader comprising:
   a feed roller, disposed at a position higher than the start hole, and feeding the wire electrode to the start hole; and
   a vertical drive device, disposed between the feed roller and the start hole, and moving the wire electrode up and down slightly, wherein the vertical drive device comprises:
   a vertical path through which the wire electrode passes;
   a first wire guide having a guide hole which forms the vertical path and is small to an extent that the compressed air is unable to pass through;
   a first air supply path, communicating with the vertical path at a position lower than the guide hole;
   a second air supply path, communicating with the vertical path at a position higher than the guide hole; and
   a compressed air supply device for supplying the compressed air to the vertical path alternately in an upward direction through the second air supply path and in a downward direction through the first air supply path.

5. The wire electrical discharge machining apparatus according to claim 4, wherein the vertical drive device comprises:
   a second wire guide, disposed at a position higher than the first wire guide.

6. The wire electrical discharge machining apparatus according to claim 5, wherein the second wire guide has a guide clearance which is large to an extent that the compressed air is able to pass through.

* * * * *